June 5, 1934.  F. HERBST ET AL  1,961,359

CAGE WALL STRUCTURE

Filed July 29, 1932

Inventors:
Fred Herbst and
Fred Herbst, Jr.

Patented June 5, 1934

1,961,359

UNITED STATES PATENT OFFICE 1,961,359

CAGE WALL STRUCTURE

Fred Herbst and Fred Herbst, Jr., Chicago, Ill.

Application July 29, 1932, Serial No. 625,842

1 Claim. (Cl. 245—2)

This invention relates to bird cages, and is more particularly directed to a bird cage construction which is vermin and insect proof, and in which the wires forming the cage are maintained in predetermined spaced relationship. While the invention is disclosed in connection with the construction of bird cages, it is to be understood that it may equally well be applied to any other type of cage or enclosure for small animals or the like.

In the preferred embodiment of the invention, we provide a bird cage formed of a plurality of vertically extending wires which are held in rigid spaced position by means of laterally extending bands soldered to the wires and provided with recessed portions receiving the individual wires. The number of bands employed in any desired cage construction is dependent upon the vertical extent of the wires, and the amount of rigidity required.

In the usual type of cage construction, the crevices formed at the points where the lateral and vertical wires overlap form breeding places for vermin, parasites and insects, and the use of various attachments, and as feeding bowls, bathing bowls and the like which are clipped to these wires serve as additional places in which these vermin or the like may collect and breed.

It is therefore an object of the present invention to provide a bird or similar cage construction which shall not have any crevices or openings wherein vermin or the like may breed or collect.

Another object of the invention is to provide a cage construction in which the wires forming the cage shall be held in fixed spaced relationship.

Another object of the invention is to provide a construction for bird cages and the like which is capable of economical manufacture, is simple in design, neat in appearance, and is adapted for use in connection with any desired form of cage.

Other objects and advantages will appear from the following detailed description, which, together with the accompanying drawing, will disclose to those skilled in the art the particular construction and application of a preferred embodiment of my invention.

Figure 1:
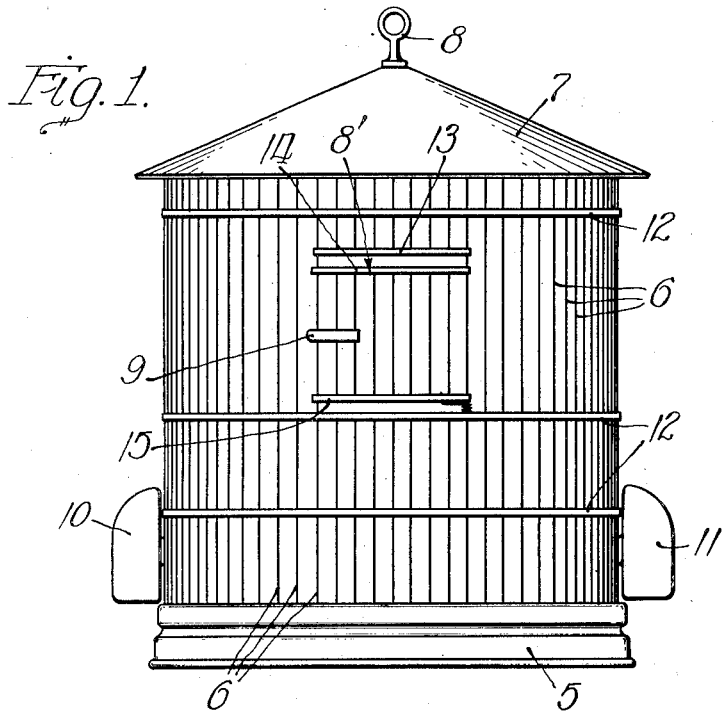
Figure 1 is an elevation view of a bird cage constructed in accordance with the teachings of the invention.

Referring now to Figure 1, in which we have disclosed a common type of bird cage constructed in accordance with the teachings of the invention, the cage is provided with a base or supporting portion 5, in which the lower end of a plurality of vertically extending wires 6 are adapted to be engaged and supported. The upper ends of the wires 6 are suitably secured in a conically shaped cover 7, the particular form of cover provided being capable of variation within the scope of the invention, which cover 7 is provided with a ring supporting member 8 for attachment to any desired suspension supporting means. The cage is provided with a door 8', which is provided with a latch 9 for maintaining the same closed. A spring normally urges the door to closed position. Suitable feeding and bathing bowls 10 and 11 may be provided, and may be secured to the cage in any desired manner.

Figure 2:
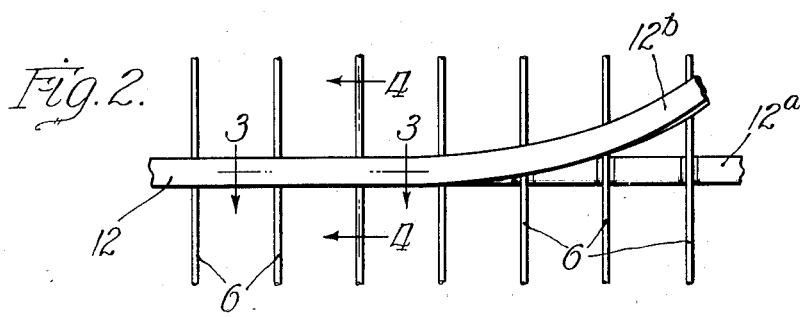
Figure 2 is an enlarged and partially broken away elevational view of a section of the cage construction, showing the manner in which the wires are held in position by means of the laterally extending bands.
Figure 3:
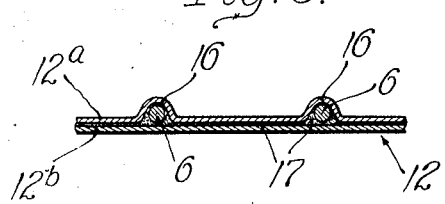
Figure 3 is a sectional view, taken substantially on the line 3—3 of Figure 2, showing in detail the manner in which the wires are secured to the lateral bands.
Figure 4:
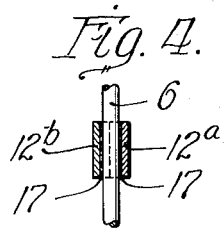
Figure 4 is an enlarged sectional view, taken substantially on the line 4—4 of Figure 2.

Extending laterally about the cage, and serving to support the wires in fixed spaced relationship, are a plurality of bands 12, shown in more detail in Figures 2 to 4. A similar supporting band 13 may be provided above the door opening, and the frame of the door may be formed in the same manner, as indicated by numerals 14 and 15.

Referring now to Figures 2 to 4, inclusive, the bands, such as the bands 12 of Figure 1, comprise an inner band 12a and an outer band 12b, which bands have their engaging faces tinned for a purpose to be hereinafter described. The band 12a, as shown in detail in Figure 3, is provided at spaced intervals with recessed or grooved portions 16, which portions are adapted to receive the vertically extending wires 6 forming the cage construction. These grooves 16 are preferably slightly larger than the diameter of the wires 6, so that the wires may nest therein without protruding over engaging surface of the band 12a. The provision of the grooves 16 prevents the wires 6 from having any lateral movement with respect to the band, and thus holds the wires in fixed spaced relationship.

The band 12b is preferably flat, and has one surface thereof tinned to engage with the tinned surface of the band 12a. The band 12b is adapted to be applied, after the wires 6 have been engaged in the grooves 16, over the corresponding surface of the band 12a, as shown in Figure 3, and, by the application of heat, the tinned surfaces are fused and flow into the interstices between the bands and between the wires 6 and the bands. This tinning material, or solder, is indicated by the numeral 17 in Figures 3 and 4, and, as shown, completely fills the spaces about the wires 6 and between the bands 12a and 12b. It is thus apparent that there are no crevices provided in which vermin, parasites, or insects may collect and breed.

The bands 13, 14 and 15 may be formed in a similar manner. It will be noted that the smooth side of the laterally extending bands 12, or, in other words, the substantially flat band 12b, is positioned upon the outer surface of the cage, in order to provide a neat appearing cage, while the inner bands 12a, which receive the wires 6, provide the requisite strength for rigidly supporting the wires 6 in proper position to maintain the cage in fixed alignment, and to provide the requisite strength which is necessary in a cage of this type.

It is to be understood that both the base or bottom support 5, and the cover 7 may be secured to the wires 6 in a similar manner by the provision of a band corresponding to the band 12a, which may be secured to the wires 6 and to the support 5 in a manner similar to that described in connection with the bands 12a and 12b. Also, the feeding and bathing bowls 10 and 11 may be provided with strips corresponding to the band 12b, which may be secured to the wires 6 by means of a second band, corresponding to the band 12a, receiving the wires and secured to the outer band. It is to be understood that the bowls may be removed from their supporting means, if desired, for the purposes of cleaning the same.

It is therefore apparent that I have provided a cage construction for birds, small animals and the like, which is of great strength, neat in appearance, and of simple design. The bands 12 may be bent in any desired shape to conform to the type of cage desired, the circular cage shown in the drawing serving merely to illustrate one embodiment of the invention, and the bands are easily applied to the wires 6, because of the provision of the grooves 16 which accurately space the wires in fixed position, so that the cage can be constructed economically. The provision of the tinning material upon the engaging faces of the bands provides means for positively securing the bands together, while at the same time completely filling any crevices or depressions between the bands and between the bands and the wires, so as to prevent the breeding or collecting of vermin or the like at these points.

We do not intend to be limited to the exact details shown and described in connection with the illustrated embodiment of our invention, since the construction disclosed may be applied in the formation of a variety of cages of any desired form or type. The invention is therefore to be limited only as defined by the spirit and scope of the appended claim.

We claim:

A metallic cage wall structure adapted to be used for housing birds or the like, comprising a plurality of longitudinally extending wires, and a pair of relatively thin transversely extending continuous band members receiving said wires between them, one of said band members being substantially flat with a smooth external surface, the other of said band members having wire-embracing recesses formed therein, the band members and the wires all being bonded together by solder which fills all crevices therebetween.

FRED HERBST.
FRED HERBST, JR.